UNITED STATES PATENT OFFICE.

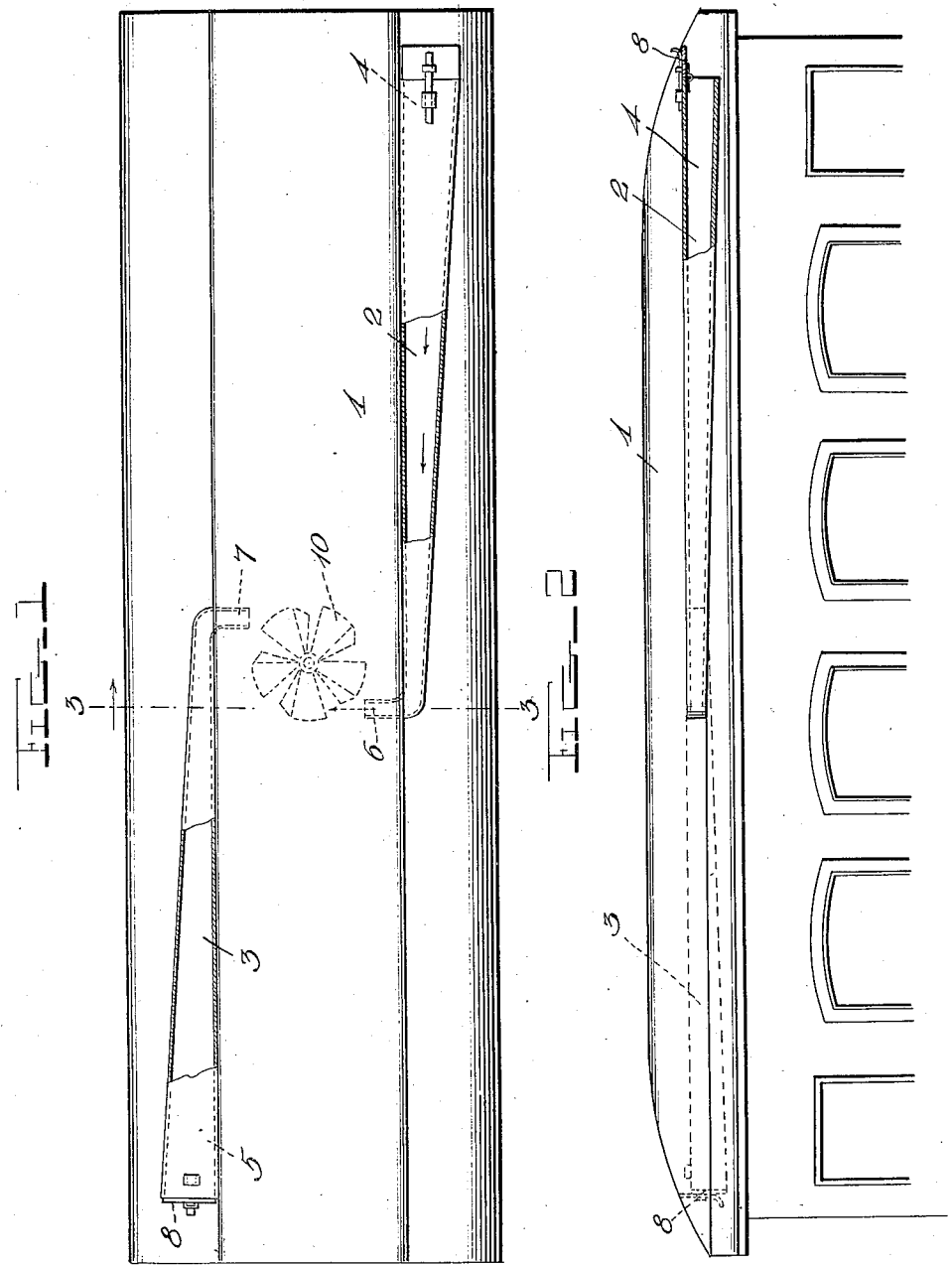

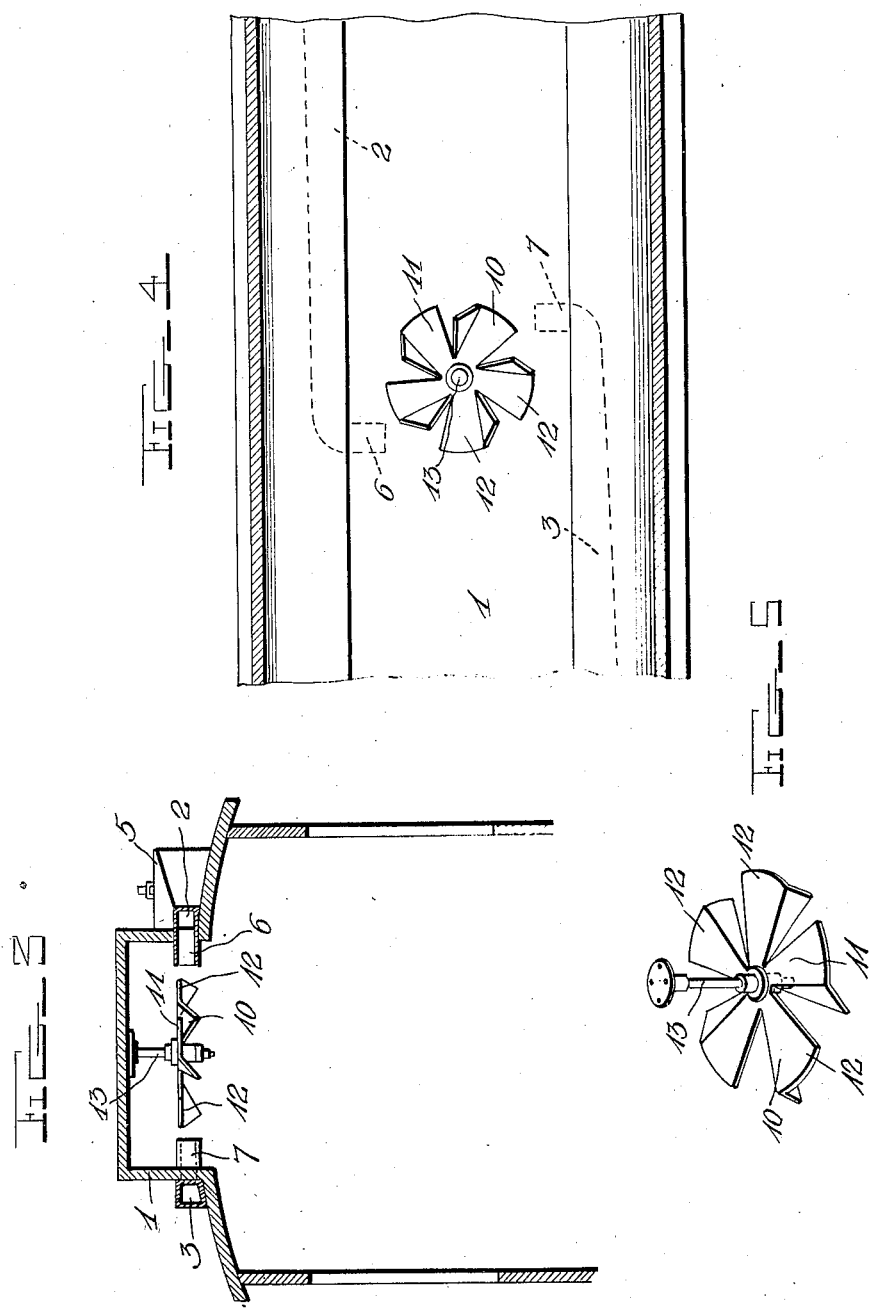

THOMAS W. FITZGERALD, OF NEW YORK, N. Y., AND ATTILIA M. C. DEVITALIS, OF MADISON, NEW JERSEY.

CAR-FAN.

No. 912,553.　　　Specification of Letters Patent.　　　Patented Feb. 16, 1909.

Application filed November 14, 1907. Serial No. 402,207.

*To all whom it may concern:*

Be it known that we, THOMAS W. FITZGERALD, a citizen of the United States, residing at New York, county of New York, N. Y., and ATTILIA M. C. DEVITALIS, a citizen of the United States, residing at Madison, in the county of Morris and State of New Jersey, have invented certain new and useful Improvements in Car-Fans; and we do declare the following to be a full, clear, and exact description of the invention, such as will enable others skilled in the art to which it appertains to make and use the same.

This invention relates to an improved fan especially adapted for use in subway cars.

The object of the invention is to so construct and arrange an air distributing fan within a car as to adapt it for operation by a forced draft, caused by the movement of the car in either direction.

Another object is to so construct the fan blades that the fan will continue to revolve for some minutes after the air current ceases, as for instance, when the car is stopped at stations.

In the accompanying drawings,—Figure 1 represents a top plan view of the top or roof of a car with portions broken out; Fig. 2 represents a side elevation thereof with parts broken out; Fig. 3 represents a transverse section taken on line 3—3 of Fig. 1; Fig. 4 represents a bottom plan view of the central portion of a car top showing the fan and the air inlets; Fig. 5 represents a perspective view of the fan detached.

In the embodiment illustrated, a car top 1 is shown having air-collecting tubes 2 and 3 arranged longitudinally of the car and extending from opposite ends thereof on its opposite sides, and terminating slightly beyond the center of the car. These tubes are preferably made approximately L-shaped, have flaring gathering mouths 4 and 5 and taper gradually toward their inner ends, said inner ends being bent to form the laterally projecting, inwardly extending tubes 6 and 7, which open on the interior of the car at opposite sides thereof and in staggered relation to provide for the impinging of the air issuing therefrom to the blades in proper relation to cause the fan 10 to revolve. The mouths of the tubes 2 and 3 are preferably provided with closures in the form of hinged trap doors, as 8, to shut off the air when it is desired to stop the fans, or for other purposes.

In the embodiment herein illustrated, one fan, 10, only is shown arranged at the center of the car, but it will be understood that more may be provided if desired, and additional branch tubes provided for operating them. The fan 10 is mounted on ball-bearings in the top of the car, preferably at the center thereof between the oppositely disposed air inlet pipes 6 and 7. As shown, the blades of this fan are formed by radially slitting a disk 11 to provide any desired number of blades, as 12, five being here shown. One edge of each of these blades 12 is bent at a suitable angle, preferably about 30°, the bent edge of one blade being arranged opposite the straight edge of the adjacent blade, and the bend in each blade being preferably in the same direction on the same side of the disk. A shaft 13 depends from the inner face of the car top 1 and passes through the center of the disk 11 with ball-bearings arranged between said disk and shaft to provide for the revolving of the fan thereon with the least possible amount of friction.

The gathering tubes 2 and 3 being arranged on opposite sides of the car and opening at opposite ends thereof, provide for the operation of the fan when the car is running in either direction.

We claim as our invention:

1. The combination with a car having an air distributing fan mounted to revolve therein, air collecting tubes arranged longitudinally of the car with the mouths thereof opening at opposite ends of said car, each tube being provided at its inner end with a laterally extending arm arranged to discharge against the blades of the fan in position to cause said fan to revolve and distribute the air admitted through said tubes into the body of the car.

2. The combination with a car having an air distributing fan mounted to revolve therein, approximately L-shaped air collecting tubes mounted longitudinally on the car on opposite sides thereof, the mouths of said tubes being arranged at opposite ends of the car and the short arms thereof extending inwardly in position to discharge the air collected by said pipes on to the blades of said fan to cause said fan to revolve and distribute the air admitted through said pipes into the body of the car.

In testimony whereof we have hereunto set our hands in presence of two subscribing witnesses.

THOMAS W. FITZGERALD.
ATTILIA M. C. DEVITALIS.

Witnesses:
ALBERT F. NOVAK,
JOHN DE HART.